(12) United States Patent  
Graves

(10) Patent No.: US 6,366,716 B1
(45) Date of Patent: Apr. 2, 2002

(54) OPTICAL SWITCHING DEVICE

(75) Inventor: Alan F. Graves, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 142 days.

(21) Appl. No.: 09/593,697

(22) Filed: Jun. 15, 2000

(51) Int. Cl.[7] .............................. G02B 6/26; H01S 3/00

(52) U.S. Cl. ............................. 385/17; 385/14; 385/15; 385/16; 385/18; 359/341

(58) Field of Search .............................. 385/15, 16, 17, 385/18, 20, 22, 24, 39, 40, 14; 359/341

(56) References Cited

U.S. PATENT DOCUMENTS

| | | | | |
|---|---|---|---|---|
| 5,761,352 A | * | 6/1998 | Kitajima et al. | 385/16 |
| 6,005,694 A | * | 12/1999 | Liu | 359/117 X |
| 6,023,359 A | * | 2/2000 | Asahi | 359/119 |
| 6,052,222 A | * | 4/2000 | Kitamura | 372/66 X |
| 6,222,653 B1 | * | 4/2001 | Asahi | 359/110 |
| 6,243,178 B1 | * | 6/2001 | Suemura et al. | 359/128 |
| 6,253,000 B1 | * | 6/2001 | Madsen et al. | 385/16 |
| 6,292,281 B1 | * | 9/2001 | Bala et al. | 359/110 |
| 6,317,529 B1 | * | 11/2001 | Kashima | 385/16 |
| 6,320,995 B1 | * | 11/2001 | Schroeder | 385/17 |

OTHER PUBLICATIONS

"Free–space Micromachined Optical–Switching Technologies and Architectures", L.Y. Lin, OFC99, Session W14–1 Proceedings, Feb. 24, 1999, pp. 154–156.

* cited by examiner

Primary Examiner—Brian Healy
(74) Attorney, Agent, or Firm—Dallas F. Smith

(57) ABSTRACT

A single Hybrid Optical Integrated Circuit that contains an optical switch having six groups of ports using microelectron mechanical or six-port MEMS for short, amplifiers, laser pumps (or inputs from laser pumps) in a single package. This is done either by providing alignment features between the MEMS devices and the amplifier silicon substrate, or by building both on a common silicon substrate. The optical switching device provides the expansion capability and add/drop functionality desired via the optical expansion input and output ports and the optical inter-matrix input and output ports, respectively. Additionally, since these separate matrices of divertors are used to selectively couple the ports of the device, less divertors are required than if one large matrix of divertors were used. Further, the optical path length, a major issue in the design of such devices, is less in this structure than it would be in a single MEMS crosspoint providing a similar function. The six-port arrangement facilitates mechanical fabrication compared to eight-port arrangements. The resultant module can be used to implement the complete optical path for one plane of a wavelength-plane optical switch, with built in access to an external wavelength converter, an ability to expand the wavelength plane size by use of expansion ports and an ability to compensate for amplitude errors in the switched signals.

24 Claims, 8 Drawing Sheets

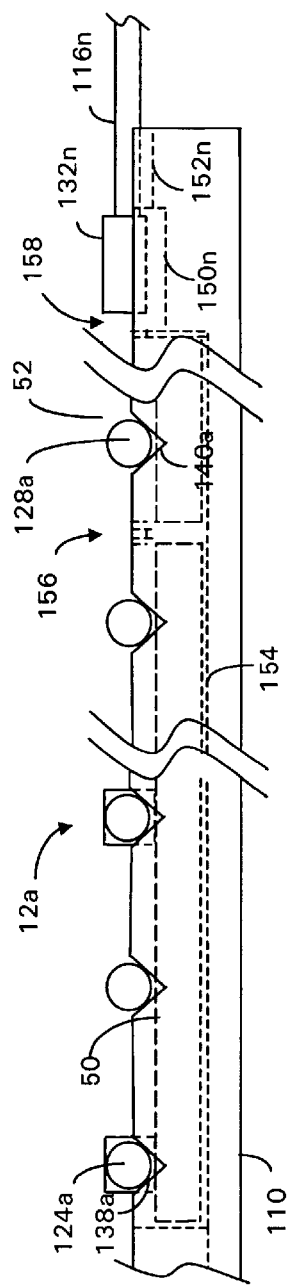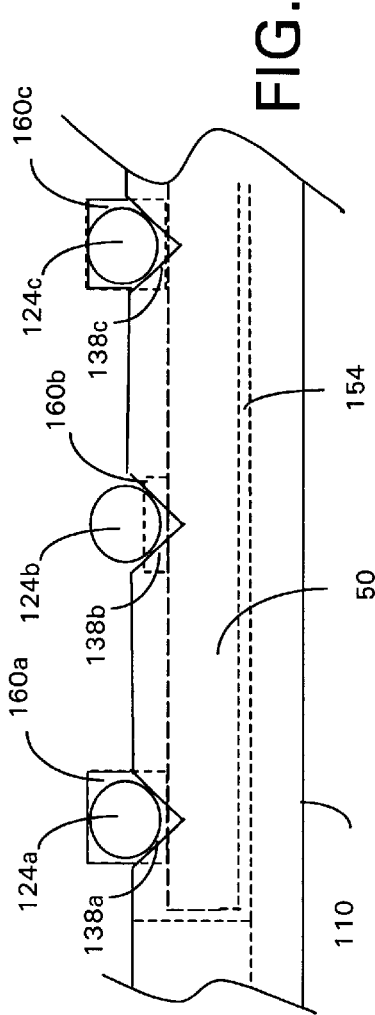

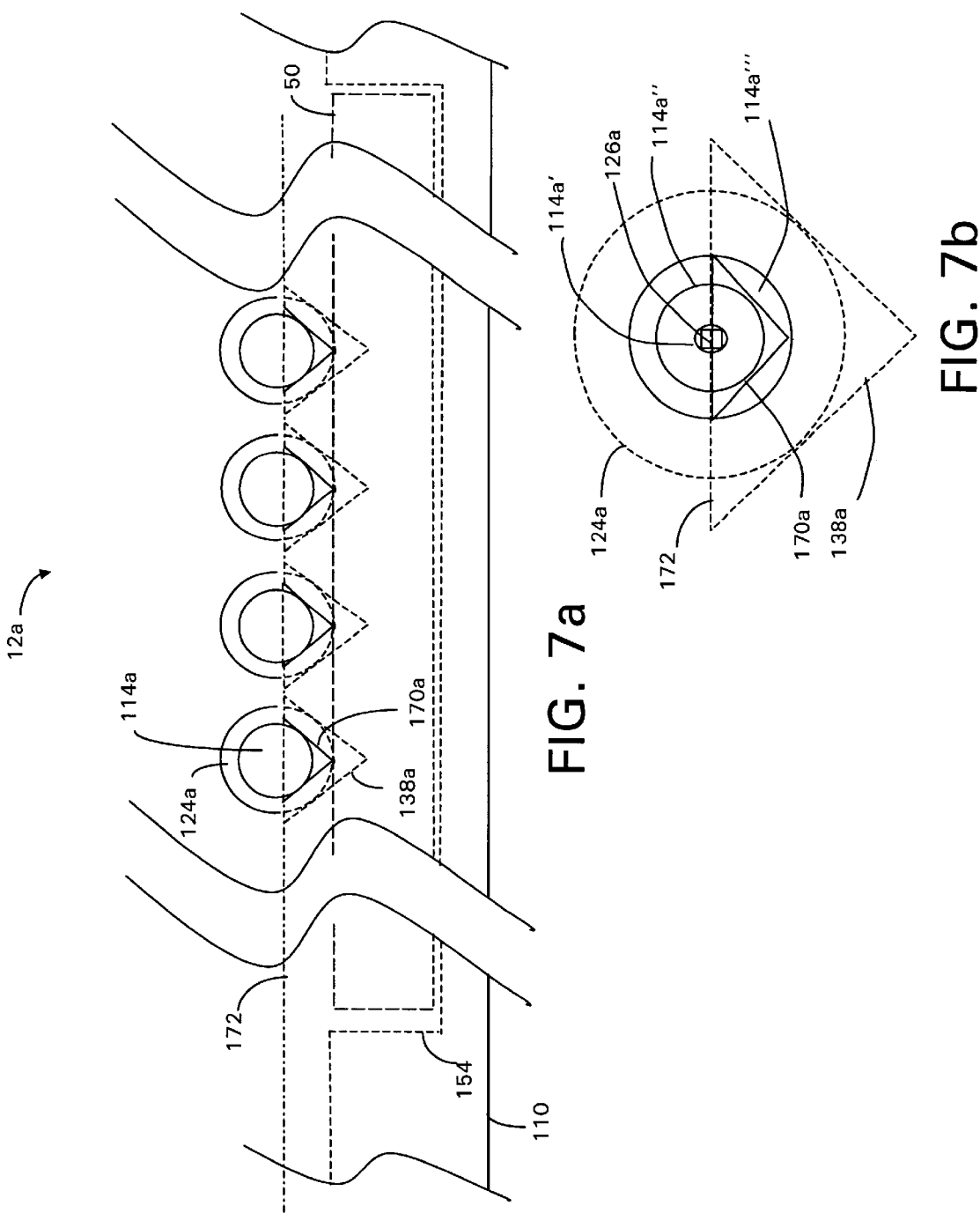

OPTICAL SWITCHING DEVICE

CROSS-REFERENCE TO RELATED APPLICATIONS

The present application is related in subject matter to co-pending U.S. application Ser. No. 09/511,065, entitled "Switch For Optical Signals", filed on Feb. 23, 2000, assigned to the Assignee of the present invention and hereby incorporated by reference herein in its entirety.

FIELD OF THE INVENTION

The present invention relates generally to systems for switching optical signals and more particularly to optical switching devices used as components in such systems.

BACKGROUND OF THE INVENTION

It is known to use mirrors in micro-machine devices to divert an optical signal from an input of the device to any one of a plurality of outputs of the device. For example, Lih Y. Lin describes such a device in the form of a Micro-Electro-Mechanical System (MEMs) in an article entitled "Free-Space Micromachined Optical-Switching Technologies and Architectures" in OFC99 Session W14-1 Proceedings published Feb. 24, 1999. Optical signals switched by Lin's device experience a power loss of about 5 dB when switched from an input to an output port of the device. While this amount of loss may be satisfactory for systems that switch optical signals through only one such MEMs switching device, the loss may be excessive for systems having multiple MEMs switching devices in a signal path. For example, a three-stage CLOS switching architecture of these MEMs switching devices in series would have a 15 dB power loss (i.e., 5 dB per stage) across the architecture from input to output.

In addition to power loss, another consideration in selecting an optical switching device is the ability to expand the input/output port capacity of an optical switching system built from the devices. This ability can be realized by providing each switching device with a plurality of input throughports, each input throughport aligned with a respective output port, and a plurality of output throughports, each output throughport aligned with a respective input port, as described in the related co-pending U.S. application Ser. No. 09/511,065. Expansion of the switching system can then be achieved by adding more MEMs switching devices to each switching matrix of the system and coupling output ports to input throughports and output throughports to input ports of adjacent MEM switching devices. This expansion can be realized without excessive losses since the maximum loss from port to throughport is significantly less than the maximum loss from port to port.

It may also be desirable to provide, in a switching matrix, the ability to add and drop optical signals from the matrix. For example, add/drop functionality is useful for performing wavelength conversion on signals switched by the system. Wavelength conversion is performed in order to alleviate blocking that occurs when two optical signals of the same wavelength need to egress a Wavelength Division Multiplexed (WDM) switching system from the same output port.

In view of the above, there is a need for an optical switching device that addresses the requirements of input/output port expansion and add/drop functionality described above. It would further be desirable that such a device be adequate for use in switching systems having multiple such devices in a switched signal path.

SUMMARY OF THE INVENTION

It is an object of the present invention to provide an improved optical switching device.

It is our intent to provide a switching element for use in a practical low cost wavelength plane switch. One aspect of this is a MEMS-based optical crosspoint array with six port groups (6P MEMS). Other aspects are providing optical amplification on a per optical wavelength controllable basis in the wavelength plane switch for both reducing/eliminating switch loss and for performing gain-flattening between paths through the switch in a commonly packaged module to control costs.

An embodiment of the present invention provides a single Hybrid Optical Integrated Circuit that contains the 6P MEMS, amplifiers, laser pumps (or inputs from laser pumps) in a single package. This is done either by providing alignment features between the MEMS devices and the amplifier silicon substrate, or by building both on a common silicon substrate.

According to an aspect of the present invention there is provided an optical switching device comprising:
  a first optical switch matrix having first and second port groups associated therewith and a plurality of optical inputs and a plurality of optical outputs;
  a second optical switch matrix having third and fourth port groups associated therewith and a plurality of outputs coupled to the plurality of optical input of the first optical matrix switch;
  a third optical switch matrix having fifth and sixth port groups associated therewith and a plurality of optical inputs coupled to the plurality of optical outputs;
  whereby the first optical switch matrix provides primary switching between the first and second port groups, the second optical switch matrix provides additional input port groups using the third and fourth port groups, and the third optical switch matrix provides additional output port groups using the fifth and sixth port groups.

According to another aspect of the present invention there is provided an optical switching device comprising:
  a plurality of optical input ports;
  a plurality of optical output ports;
  a first matrix of optical divertors, each divertor being operable to divert an optical signal from one of the optical input ports to any one of a plurality of the optical output ports;
  a plurality of optical expansion input ports, each one of the optical expansion input ports coupled to a respective optical output port;
  a plurality of optical expansion output ports, each one of the optical expansion output ports coupled to a respective optical input port;
  a plurality of optical inter-matrix input ports;
  a second matrix of optical divertors, each divertor being operable to direct an optical signal from one of the optical inter-matrix input ports to any one of a plurality of the optical output ports;
  a plurality of optical inter-matrix output ports; and
  a third matrix of optical divertors, each divertor being operable to divert an optical signal from one of the optical input ports to any one of a plurality of the optical inter-matrix output ports.

The optical switching device provides the expansion capability and add/drop functionality desired via the optical expansion input and output ports and the optical inter-matrix input and output ports, respectively. Additionally, since these separate matrices of divertors are used to selectively couple the ports of the device, less divertors are required than if one large matrix of divertors were used. Further, the optical path length, a major issue in the design of such devices, is less in this structure than it would be in a single MEMS crosspoint providing a similar function.

Embodiments of the invention may include a plurality of optical amplifiers, each one of the optical amplifiers coupled in series with a respective optical output port or a respective optical inter-matrix output port.

The optical amplifiers compensate for the losses introduced into the optical switching path by the optical divertors on a path-by-path basis. This can be used to compensate for the loss of an individual switch stage or, for an externally introduced amplitude error such as that from a non-flat line system. Furthermore, the combination of amplification and switching can be used in multiple stage switches. This ability to compensate for signal power loss means the optical switching device can be used to build large switching matrices, for example 3-stage CLOS switching architectures.

Embodiments of the invention may be implemented as monolithic structures on a silicon wafer substrate. In this case optical amplifiers incorporated into an embodiment may take the form of an array of erbium doped Silica (Silicon Dioxide) or Phosphate-glass waveguides fabricated on a silicon or similar substrate, in combination with a an array of pump lasers, thereby enabling the gain of individual amplifiers to be set separately. First V-grooves in the silicon substrate provide alignment for rod lenses at inputs and outputs of the matrices of divertors and are sized to accept rod-lenses (which are large relative to the 6–10 $\mu$m $SiO_2$ waveguides) and to align the centers of these rod-lenses with the centers of the waveguides. The switching matrices are either fabricated directly on the silicon substrate or are fabricated separately and attached to the substrate after alignment with alignment feature, such as wells, etched in the substrate. Second V-grooves in the silicon substrate provide alignment for optical fibers that couple optical signals from the rod lenses or directly to the matrices of divertors. For example, these second V-grooves are dimensioned to align the core of a 125 $\mu$ fiber to the to the 6–10 $\mu$m $SiO_2$ waveguides. The facet angles in any V-groove are set by the crystal structure. Implementing the optical switching devices as monolithic structures on silicon wafers allows alignment features to be provided such that components of the devices can be positioned and interconnected within required tolerances.

Other aspects of the invention include combinations and subcombinations of the features described above other than the combinations described above.

BRIEF DESCRIPTION OF THE DRAWINGS

The invention will be further understood from the following detailed description of embodiments of the invention and accompanying drawings, in which:

FIG. 4 is a plan view of an implementation of the six-port optical switching matrix of FIG. 2a;

FIG. 5 shows the optical amplifier waveguide of FIG. 4 in greater detail;

FIG. 6a is a cross-sectional view of the wavelength-plane switch of FIG. 4 taken along the line AA;

FIG. 6b shows part of the cross-sectional view of FIG. 6a in greater detail;

FIG. 7a is a cross-sectional view of the wavelength-plane switch of FIG. 4 taken along the line BB; and FIG. 7b shows part of the cross-sectional view of FIG. 7a in greater detail.

DETAILED DESCRIPTION

Figure 1:
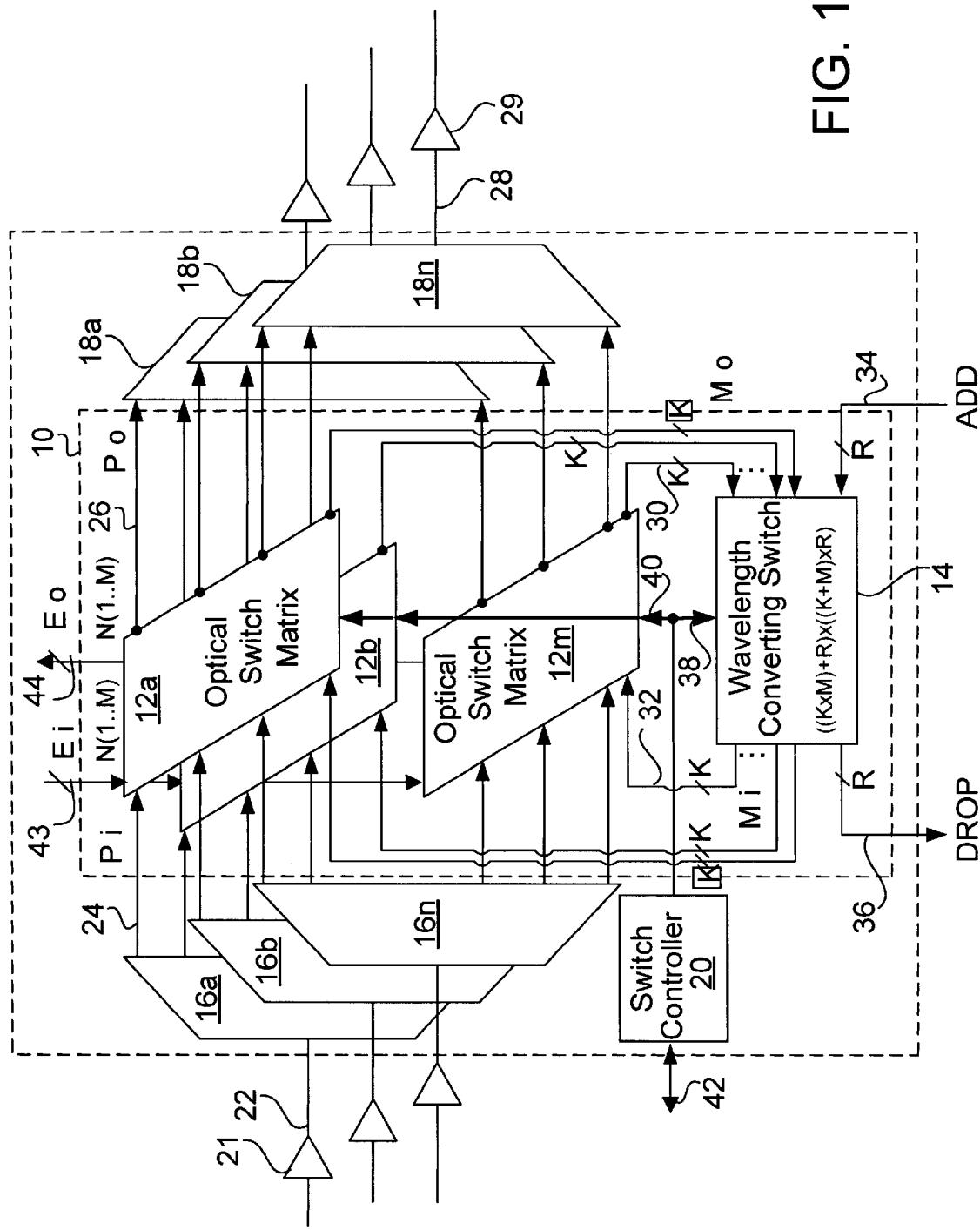
FIG. 1 is a functional block diagram of an optical switching system having a wavelength-plane optical switching sub-system.

FIG. 1 is a functional block diagram illustrating a WDM optical switching system 10. The system 10 switches Dense WDM (DWDM) optical signals, each signal consisting of M optical signal channels. Each of the M channels carries an optical signal modulated on an optical carrier of a wavelength unique to that channel. Incoming DWDM optical signals are split, or demultiplexed, into their component optical signal channels, which are then switched by the system 10, and then combined, or multiplexed, into outgoing DWDM optical signals. The system 10 has N input ports and N output ports to receive and transmit the incoming and outgoing DWDM optical signals, respectively.

The system 10 includes a wavelength-plane optical switching sub-system 12, a plurality N of 1 to M demultiplexers 16, a plurality N of M to 1 multiplexers 18, a wavelength converting switch 14 and a controller 20. After input preamplifier 21, a plurality N of fibers 22 are coupled to the plurality N of demultiplexers 16 at the ingress of the system 10, each fiber 22 coupled to a respective demultiplexer 16. Each of the demultiplexers 16 has one input and M outputs. For the purpose of example M=40 and N=24. A plurality N of array of optical interconnections 24, each of width M couple the N×M outputs of the demultiplexers 16 to M×N port inputs (Pi) of the optical switching sub-system 12. Similarly, a plurality N of array of optical interconnections 26, each of width M, couple N×M port outputs (Po) of the optical switching sub-system 12 to N×M inputs of the multiplexers 18. Each of the N multiplexers 18 has M inputs and one output. A plurality N of fibers 28 are coupled to the plurality of multiplexers 18 at the egress of the system 10, each fiber 28 coupled to a respective multiplexer 18 and an output preamplifier 29. The switching sub-system 12 is a wavelength plane structure in that it includes a distinct switching matrix, or matrices, for switching each one of the M unique wavelengths.

The optical switching sub-system 12 includes a plurality K of matrix output ports (Mo) and a plurality K of matrix input ports (Mi) for coupling optical signal channels to the wavelength converting switch 14. A plurality M of optical interconnection arrays 30, each of width K, couple K×M matrix output ports (Mo) to the wavelength converting switch 14 at its ingress. Similarly, the egress of the wavelength converting switch 14 is coupled to K×M matrix input ports (Mi) via a plurality M of optical buses 32, each of width K. The wavelength converting switch 14 has a plurality R of inputs for adding optical signal channels 34 and a plurality R of outputs for dropping optical signal channels 36.

The controller 20 has a bi-directional port 42 for receiving external input, for example from other switching systems or from a network controller, and changing the operation of the system 10 in response to the input as required. The controller 20 also communicates node status to the higher level network controller (not shown in FIG. 1. The controller 20 is coupled to the optical switching sub-system 12 via an optical or electrical communication link 40 and to the wavelength converting switch 14 via a similar link 38 for effecting this change in operation.

In operation, the system 10 receives DWDM optical signals from the fibers 22 after pre-amplification. The amplification provided in a conventional optical amplifier is on overall around 24 dB. This is achieved in two stages, a pre-amplifier and a post-amplifier, which might each have a gain of up to 19 dB. This allows combinations of filters, add-drop components or bulk (WDM) fixed impairment compensators (e.g. chromatic dispersion compensator) to be added up to an optical loss value of about 14 dB, between the output of the pre-amplifier and the input of the post-amplifier while maintaining an overall gain of 24 dB.

Hence, if standard pre-amplifiers are used on the switch input and standard post-amplifiers are used on the switch output, then the switch node would be limited to a maximum loss of 14 dB. However, the likely range of losses across a switch node such as that shown in FIG. 1 is:

| Component | Minimum Loss | Maximum Loss |
| --- | --- | --- |
| WDD | 6 dB | 8 dB |
| Optical interconnect | 0.2 dB | 1 dB |
| Switch | 4 dB | 7 dB |
| Optical interconnect | 0.2 dB | 1 dB |
| WDM | 6 dB | 8 dB |
| Total | 16.4 dB | 25 dB |

The variability of the switched path losses and reducing the overall loss. This is provided by the individually settable EDWA's, which, to provide an overall node loss of 14 dB, would have to exhibit a gain in the range 2.4–11 dB. Given that up to +/−2 dB of amplitude error/ripple may be present on the inputs, then this range would have to be increased to 0.4–13 dB. This is within the range of a 3–5 cm, active optical path EDWA. (Note that while we are showing the EDWA's as straight tracks, the high difference between the refractive index of the glass/SiO2 and the surrounding medium (air) permits tightly coiled or folded structures, too.

Each DWDM optical signal is demultiplexed into its M component optical channel signals by a respective demultiplexer 16. The optical channel signals are coupled to the optical switching sub-system 12 via the N arrays of optical interconnections 24. The optical switching sub-system 12 receives the optical channel signals at its port inputs (Pi) and switches them individually to its port outputs (Po) or matrix outputs (Mo) according to the state, or configuration, of the optical switching sub-system 12 as determined by the controller 20. The wavelength converting switch 14 has the capability of converting the wavelength of an optical channel signal to another one of the unique wavelengths of the system 10 as determined by the controller 20. Optical channel signals can also be added 34 or dropped 36 by the wavelength converting switch 14 under the direction of the controller 20. Added or converted optical channel signals on the wavelength converting switch 14 are received at the matrix inputs (Mi) of the optical switching sub-system 12 via the M K-wide buses 32. Optical channel signals received at the matrix inputs (Mi) are individually switched to the port outputs (Po) where they are transmitted to the N multiplexers 18 via the N buses 26. Each of the N multiplexers receives optical channel signals at its M inputs and multiplexes these signals into a DWDM optical signal which is output on one of the fibers 28.

The optical switching sub-system 12 also includes a plurality (N×M) expansion inputs (Ei) and a plurality (N×M) expansion outputs (Eo) for the purpose of building out, or expanding, the optical switching sub-system 12. This expansion will be described later in more detail.

Figure 2A:
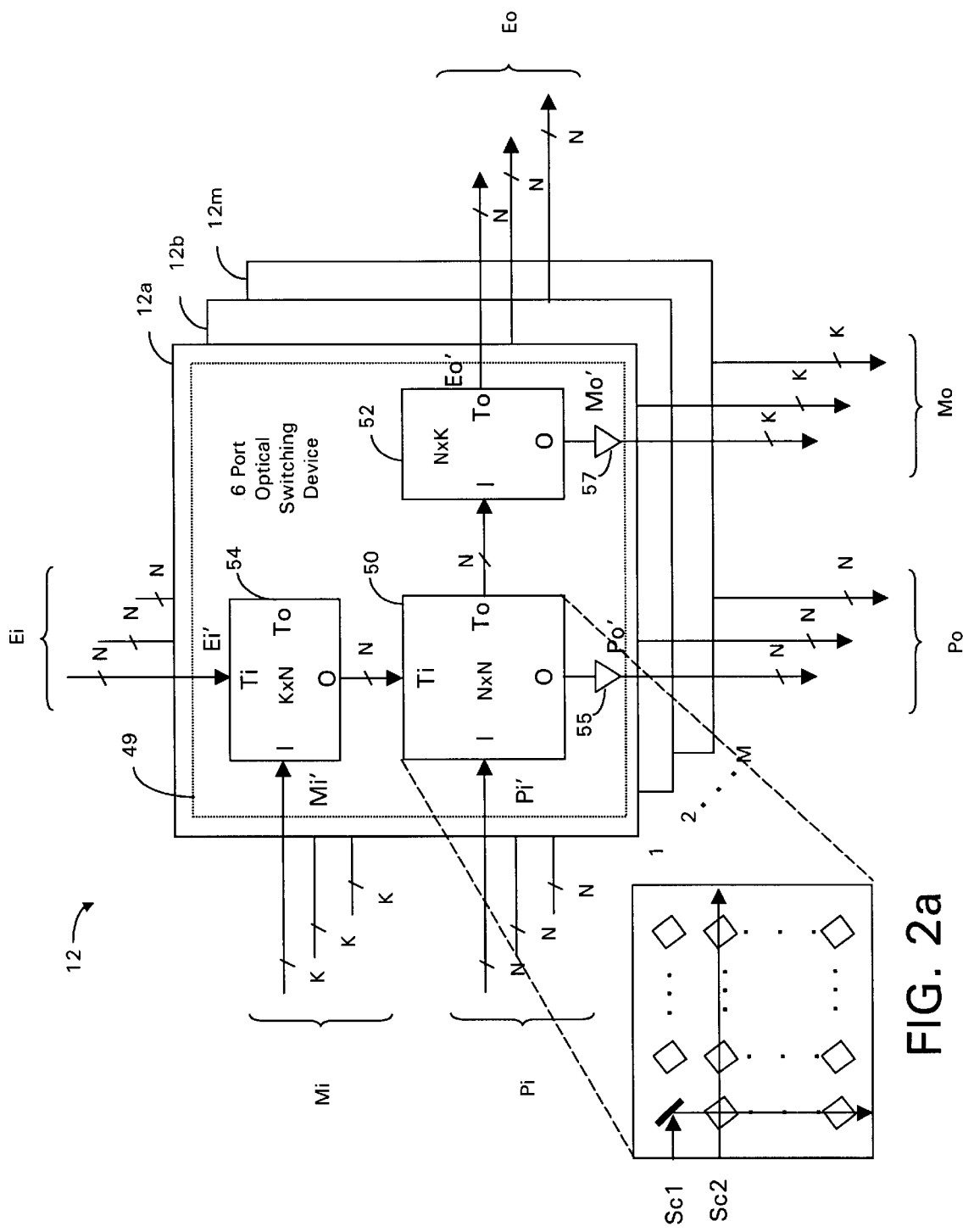
FIG. 2a is a functional block diagram showing the wavelength plane switches of the optical switching sub-system of FIG. 1 in greater detail, each wavelength plane switch includes a six-port optical switching device which is in accordance of an embodiment of the present invention.

FIG. 2a shows the optical switching sub-system 12 being comprised of a plurality M of identical wavelength-plane switch 12a to 12m. Each wavelength-plane switch 12a to 12m switches optical channel signals of a unique wavelength. That is, each of the wavelength-plane switches 12a to 12m provides switching for one of the M unique wavelengths used by the system 10. Each wavelength-plane switch 12a to 12m has a plurality N of port inputs Pi', which, taken over the M wavelength-plane switches 12a–12m, sum to provide the N×M port inputs Pi of the optical switching sub-system 12 in a wavelength-plane architectured switch. Similarly, each wavelength-plane switch 12a to 12m has N port outputs (Po'), N expansion inputs (Ei'), N expansion outputs (Eo'), K matrix inputs (Mi'), and K matrix outputs (Mo'), which, taken over the M wavelength-plane switches 12a to 12m, result in their corresponding inputs/outputs of the optical switching sub-system 12.

The wavelength-plane switch 12a will now be described in further detail. The wavelength-plane switch 12a includes a six-port optical switching device 49 in the form of a MEMs device or devices. The six-port optical switching device 49 includes an N×N four-port matrix 50 of optical divertors, which could be a MEMs optical switching device for example. The matrix 50 has N inputs (I) on one side and N outputs (O) on an adjacent side. The matrix 50 is capable of switching an optical signal arriving at any one of the inputs (I) to any one of a plurality of the outputs (O) by activation of one or more of the optical divertors of the matrix 50. In the case of a MEMs optical switching device, as shown in expanded detail of matrix 50, each optical divertor is a planar mirror, which is part of a grid arrangement of other like divertors, such that, in an activated state, the mirror intercepts an optical signal from its corresponding row input and diverts the signal to its corresponding column output. This is usually done by arranging the mirrors so that the plane of each mirror in an activated state is normal to the substrate as well as at a 45° angle with respect to its row and column in the grid. In the inactive state the mirror lies parallel to the substrate. The matrix 50 has N through inputs (Ti) on the side opposite the outputs (O). Each through input (Ti) corresponds to a respective output (O) such that an optical signal input at the through input (Ti) can pass to its respective output (O) when all of the optical divertors in alignment between the through input (Ti) and the output are in a non-activated state. Similarly, the matrix 50 has N through outputs (To), each aligned with a corresponding input (I), such that an optical signal entering at the input passes to the through outputs (To) if none of the optical divertors in its path are in an activated state. For illustrative purposes only, matrix 50 is shown with two signals Sc1 and Sc2 entering its inputs (I). Signal Sc1 is deflected through 90 degrees by an active MEMS mirror to exit from one of its outputs (O), while signal Sc2 passes straight through to exit one of its through outputs (To). The N inputs (I) of the matrix 50 are coupled to the N port inputs (Pi') of the wavelength-plane switch 12a, and the N outputs (O) of the matrix 50 are coupled to the N port outputs (Po') of the wavelength-plane switch 12a. Optionally, an optical amplifier 55 is connected in series between each output (O) of the matrix 50 and each port output (Po'). These optical amplifiers 55 compensate, partially or fully, for power lost in switching an optical signal from an input (I) to an output (O). This power loss is typically 5 dB with current MEMs optical switching devices. However, the gain of the optical amplifiers 55 is not limited to that value (5 dB), but could be another value to compensate for other losses or provide additional gain as required.

This overall power loss is typically around 20 dB with switches based on the structure of FIG. 1 and using current MEMS optical switching devices, which exhibit about 5 db of switching loss and consists of collimating beam errors, diffraction losses, mirror reflectivity losses, mirror non-flatness losses, mirror pointing accuracy losses. Of these only two, the collimating beam error and diffraction losses affect the through paths to/from the expansion ports, which as a result show much lower losses (typically of 5 db).

The six-port optical switching device 49 also includes a K×N matrix 54 of optical divertors, which typically would be of the same technology as the N×N matrix 50. The K×N matrix 54 has K inputs (I) coupled to the K matrix inputs Mi', N through inputs (Ti) coupled to the N expansion inputs Ei', and N outputs (O) coupled to the N through inputs (Ti) of the N×N matrix 50.

The six-port optical switching device 49 further includes an N×K matrix 52 of optical divertors, which typically would be of the same technology as the N×N matrix 50 and K×N matrix 54. The N×K matrix 52 has N inputs (I) coupled to the N through outputs To of the N×N matrix 50, N through outputs (To) coupled to the N expansion outputs Eo', and K outputs (O) coupled to the K matrix outputs Mo'. Optionally, an optical amplifier 57 may be series connected between each of the K outputs of the N×K matrix 52 and the K matrix outputs Mo'. The presence of an optical amplifier with optional variable gain is an integral part of building a photonic switch that is adaptable to gain requirements of the optical network in which the photonic switch is employed.

In operation, matrix 50 routes inputs which contain wavelengths being routed directly to outputs, or takes no action, the default "no action" resulting in the projected input light beam being passed on to the N×K matrix 52. This either takes action to switch/divert the light into one of its outputs, in which case the input is coupled to a drop port/lambda converter input, or matrix 52 takes no action, in which case the light passes straight through to the "expansion out" port. More specifically, the wavelength-plane switch 12a receives optical channel signals at its port inputs Pi' and the N×N matrix 50 routes them individually to either the N×K matrix 52 or the port outputs Po'. Signals routed to the N×K matrix 52 are then individually routed to either a respective one of the N expansion outputs Eo' or to any one of a plurality of the K matrix outputs Mo' by the N×K matrix 52. The N×K matrix 52 provides the capability to select any K of N signals passed through the N×N matrix 50 and direct these signals to any of K inputs of the wavelength-converting switch 14. This capability eases design restrictions placed on the wavelength-converting switch 14. For example, tunable transponders used to convert a signal channel from one wavelength to another can be arranged in K groups, with each transponder being tunable over a range of M/K channel wavelengths. In this way, tunable transponders with ranges smaller than M channel wavelengths can be used to provide a tunable range of M channel wavelengths, thereby reducing the cost of the system 10.

The N×K matrix 52 permits optical traffic concentration of traffic exiting to the wavelength converting switch 14 converter function or being dropped, while the K×N matrix 54 provides the inverse function for added traffic. This permits the amount of add/drop and/or wavelength conversion equipment to be a provisioned entity, dependent upon the needs of the switch 10. The matrices 52, 54 allow from 1 to K add/drop or wavelength converters to be provided per wavelength plane.

This provides concentration of N:1 step 1 through K which is a relatively small concentration group. This can be expanded by adding an optical switch or array of optical switches across P planes of the wavelength converting switch 14 with each of these new optical switches accessing one or more ports of each of the matrices 52 or 54.

Signals received at the matrix inputs Mi' from the wavelength converting switch 14, or from the expansion inputs Ei', are coupled to the K×N matrix 54. Signals received at the expansion inputs Ei' are individually passed to a respective one of the outputs (O) of the K×N matrix 54 and on to the N×N matrix 50 where they individually pass from a through input (Ti) to a corresponding output (O) and are then coupled to the port outputs Po'. Signals received at the matrix inputs Mi' can be switched to any K of N outputs (O) of the K×N matrix 54. As before with the N×K switch 52 this switching capability of the K×N matrix 54 provides for flexibility in the design and provisioning levels of the wavelength converting switch 14. Signals so switched by the K×N matrix 54 are then coupled to the through inputs (Ti) of the N×N matrix 50 where they are individually passed to respective outputs (O) of the N×N matrix 50 and are then coupled to the port outputs Po'.

Figure 2B:
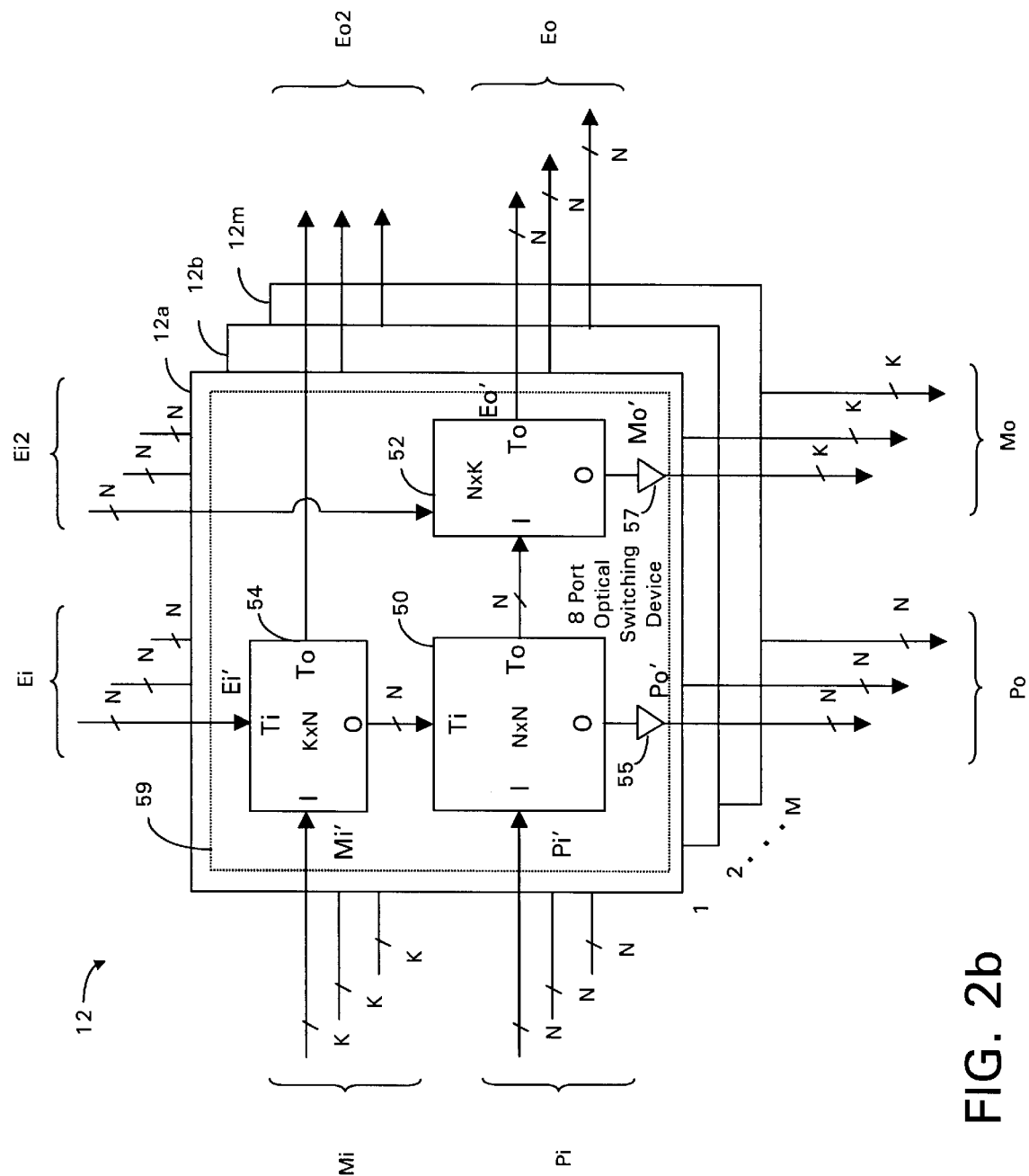
FIG. 2b is a functional block diagram of another implementation of one of the wavelength plane switches of FIG. 2a, the wavelength plane switch including an eight-port optical switching device in accordance with another embodiment of the present invention.

FIG. 2b shows a second embodiment of the wavelength-plane switches 12a to 12m. Each of the wavelength-plane switches includes an eight-port optical switching device 59. This device 59 makes use of the through output port To of the K×N matrix 54 and the through input port of the N×K matrix 52 to add new expansion output port $Eo_2$ and expansion input port $Ei_2$, respectively. The use of these devices in an expanded wavelength-plane switch will be described later.

The seventh Ei2 and eighth Eo2 port opposite to Mi' and Mo', respectively, allow for cascading of the add-drop I/O without use of the splitter, combiner. This has to be differentiated from the use of a larger 4-port MEMS device to do this job. This can be done since the worst case optical path length (measured in number of mirrors passed) would be (2N+K+1) in our proposal vs. (2N+2K−1) in a generic 4 port large MEMS device of (N+K) ports (though we would still only use the same paths in either case with the same optical loss, but the generic 4 port device has to be designed to work if the 2N+2K−1 path is activated). In addition, it is believed that large monolithic 2D-MEMS structures become very complex to design, fabricate and yield at sizes above 32×32, corresponding to 1024 mirrors and mirrors drivers. This leads to the concept of tiling parts.

Figure 3A:
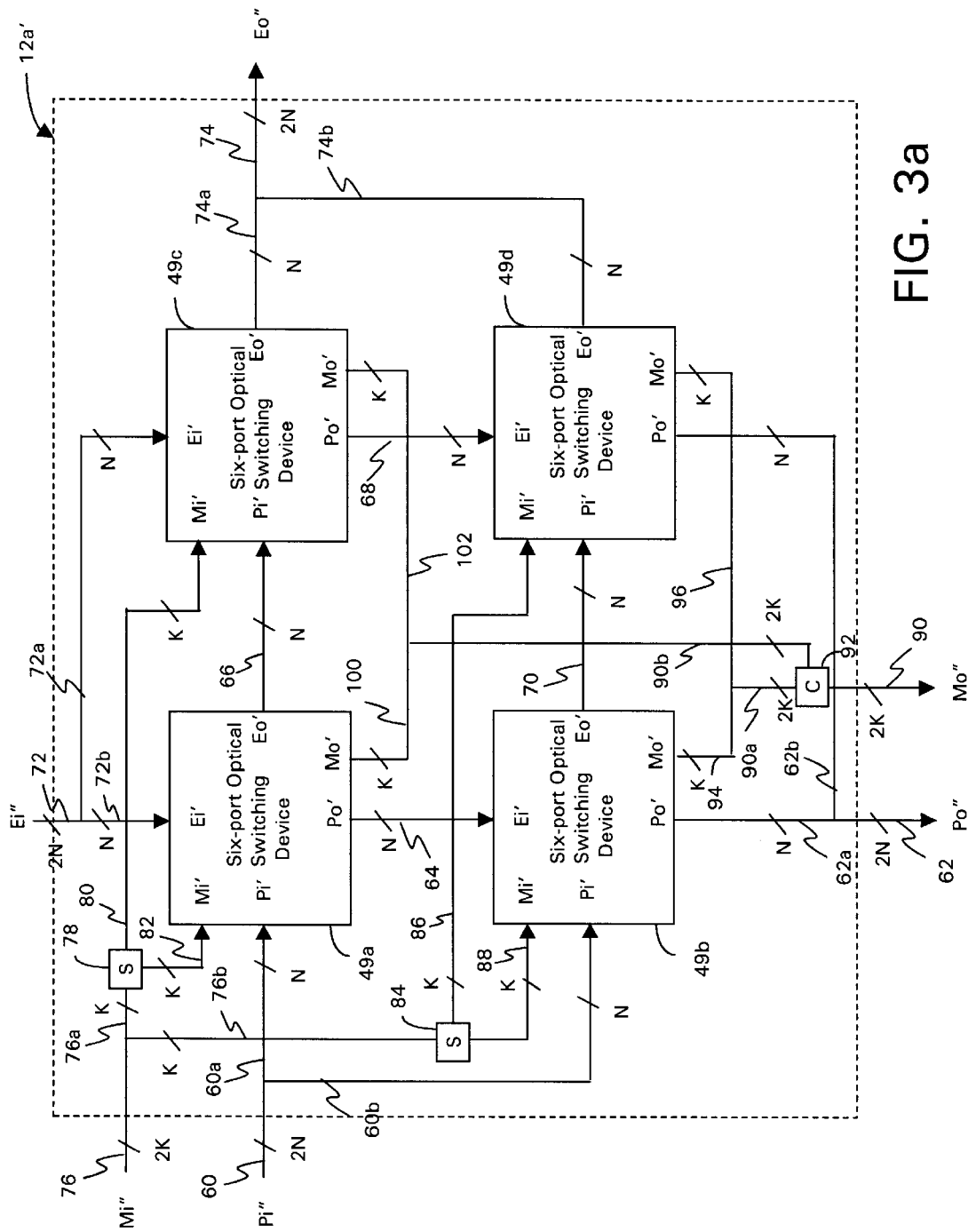
FIG. 3a is a functional block diagram of yet another implementation of one of the wavelength plane switches of FIG. 2a, the wavelength plane switch including four six-port optical switching devices of FIG. 2a arranged in an expanded configuration.

FIG. 3a shows an expanded wavelength-plane switch 12a'. The expanded wavelength-plane switch 12a' is comprised of four identical six-port optical switching devices 49a–d, each being identical to the six-port optical switching device 49 described previously with reference to FIG. 2a. The expanded wavelength-plane switch 12a' has 2N port inputs Pi" and 2N port outputs Po". An optical signal received at any one of the 2N port inputs Pi" can be switched to any one of the 2N port outputs Po". The expanded wavelength-plane switch 12a' also has 2N expansion outputs (Eo"), each corresponding to a respective port input Pi", and has 2N expansion inputs (Ei"), each corresponding to a respective port output Po". An optical signal received at any one of the port inputs Pi" can be passed to an expansion output Eo" corresponding to the port input via intervening optical switching devices 49a–d when the intervening devices 49a–d have no activated diverters in the path of the signal. Similarly, an optical signal received at any one of the expansion in puts Ei" can be passed to a port output Po" corresponding to the expansion input via intervening optical switching devices 49a–d when the intervening devices 49a–d have no activated divertors in the path of the signal. The expanded wavelength-plane switch 12a' further includes 2K matrix inputs Mi" and 2K matrix outputs Mo". An optical signal received at any one of the 2K matrix inputs Mi" can be switched to any one of the port outputs Po" via the optical switching devices 49a–d and other components used to interconnect the devices 49a–d as will be described later. Similarly, an optical signal received at any one of the 2N port inputs Pi" can be switched to any one of the 2K matrix outputs Mo".

The interconnection of the devices 49a–d will now be described. The 2N port inputs Pi" are coupled to the devices 49a and 49b by an optical bus 60 of width 2N of which one half 60a of width N is coupled to the port inputs Pi' of the device 49a and the other half 60b of width N is coupled to the port inputs Pi' of the device 49b. The 2N port outputs Po" are coupled to the devices 49b and 49d by an optical bus 62 of width 2N of which one half 62a of width N is coupled to the port outputs Po' of the device 49b and the other half 62b also of width N is coupled to the port outputs Po' of the device 49d. The N port outputs Po' of the device 49a are coupled to the N expansion inputs Ei' of the device 49b by an optical bus 64 of width N. Similarly the N port outputs Po' of the device 49c are coupled to the N expansion inputs Ei' of the device 49d by an optical bus 68 of width N. The N expansion outputs Eo' of the device 49a are coupled to the N port inputs Pi' of the matrix 49c by an optical bus 66 of width N. Similarly, the N expansion outputs Eo' of the device 49b are coupled to the N port inputs Pi' of the device 49d by an optical bus 70 of width N.

The 2N expansion inputs Ei" are coupled to the devices 49a and 49c via an optical bus 72 of width 2N of which one half 72a is coupled to the N expansion inputs Ei' of the device 49a and the other half 72b also of width N is coupled to the N expansion inputs Ei' of the device 49c. The 2N expansion outputs Eo" are coupled to the devices 49c and 49d by an optical bus 74 of width 2N of which one half 74a, of width N, is coupled to the N expansion outputs Eo' of the device 49c and the other half 74b, also of width N, is coupled to the N expansion outputs Eo' of the device 49d.

The expanded wavelength-plane switch 12a' further includes two groups of K 1:2 optical splitters 78, 84 and one group of K 2:1 optical combiners 92 for the purpose of coupling the 2K matrix inputs Mi" and 2K matrix outputs Mo" to the devices 49a to 49d.

The 2K matrix inputs Mi" are coupled to the groups of splitters 78, 84 by an optical bus 76 of width 2K, of which one half 76a, of width K, is coupled to the inputs of the first group of splitters 78, and the other half 76b, also of width K, is coupled to the inputs of the second group of splitters 84. Two optical buses 80 and 82, each of width K, couple the outputs of the first group of splitters 78 to the matrix inputs Mi' of the devices 49c and 49a, respectively. Similarly, two optical buses 86 and 88, each of width K, couple the outputs of the second group of splitters 84 to the matrix inputs Mi' of the devices 49d and 49b respectively.

The 2K matrix outputs Mo" are coupled to the group of combiners 92 by an optical bus 90 of width 2K. Optical interconnections 90a and 90b, both of width 2K, are input into the combiners 92. The interconnection 90a is split into two optical interconnections 94,96 and coupled to the matrix outputs Mo' of the devices 49b and 49d, respectively. The other half 90b of the interconnect of the first group of combiners 92, and the other half 90b, also of width K, is coupled to the outputs of the second group of combiners 98. Two optical buses 94 and 96, each of width K, couple the inputs of the first group of combiners 92 to the matrix outputs Mo' of the matrices 12a2 and 49d, respectively. Similarly, two optical buses 100 and 102, each of width K, couple the inputs of the second group of combiners 98 to the matrix outputs Mo' of the matrices 49a and 49c, respectively.

Figure 3B:
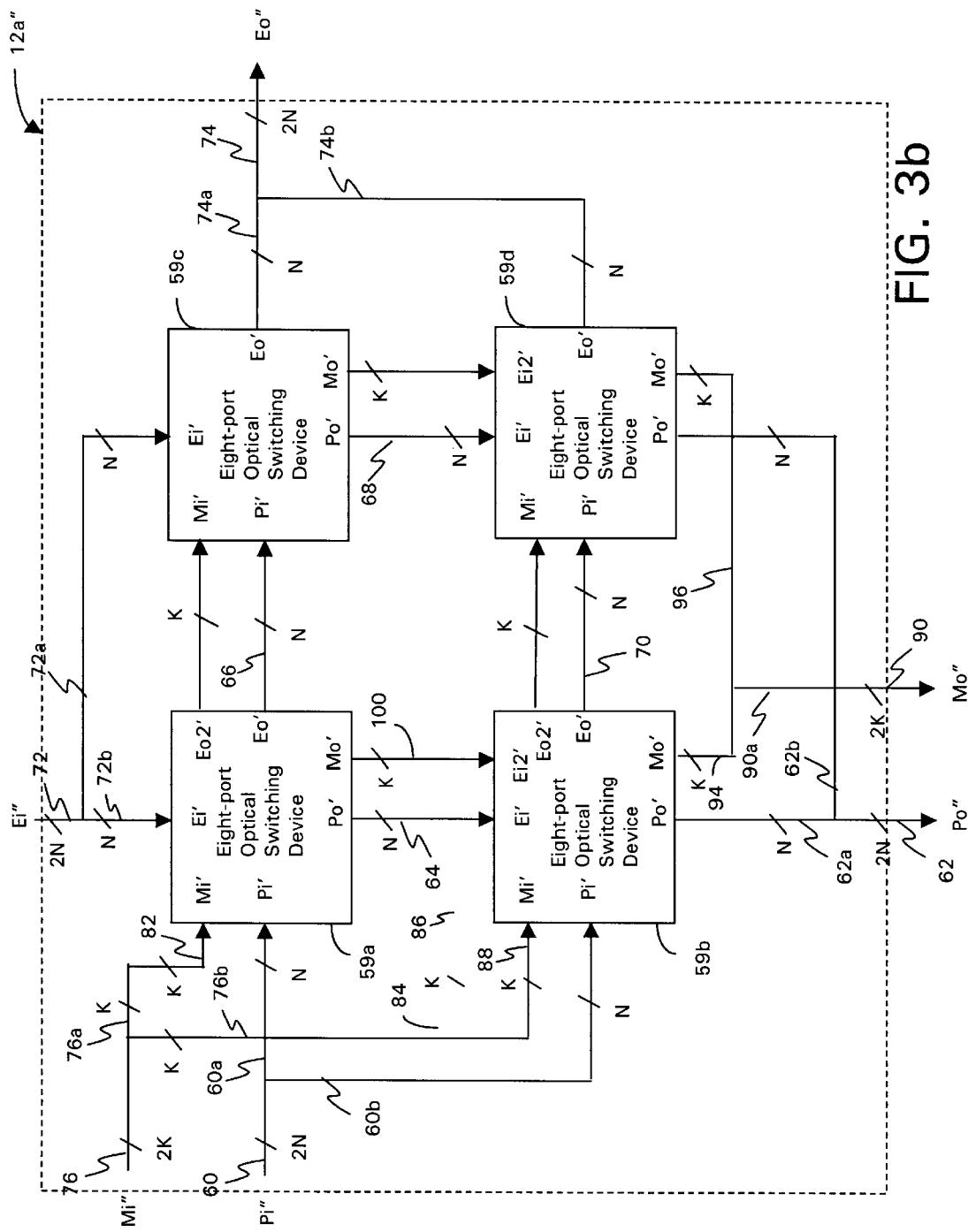
FIG. 3b is a functional block diagram of still another implementation of one of the wavelength plane switches of FIG. 2a, the wavelength plane switch including four eight-port optical switching devices of FIG. 2b arranged in an expanded configuration.

FIG. 3b shows another embodiment of the expanded wavelength-plane switch 12a". This embodiment uses the 8-port optical switching device 59 of FIG. 2b to eliminate the need for splitters 78,84 and combiners 92,98. The interconnection of the devices 59a to 59d is similar to that of the expanded wavelength-plane switch 12' of FIG. 3a except with respect to the expansion outputs $Eo_2'$ of device 59a which are connected to the matrix inputs Mi' of device 59c and the expansion inputs $Ei_2'$ of the device 59b and 59d which are connected to the matrix outputs Mo' of the devices 59a and 59c, respectively. Operation of this expanded wavelength-plane switch 12a" is the same as that of expanded matrix 12a' of FIG. 3a from the perspective of its inputs Pi", Mi", Ei" and outputs Po", Mo", and Eo".

Figure 4:
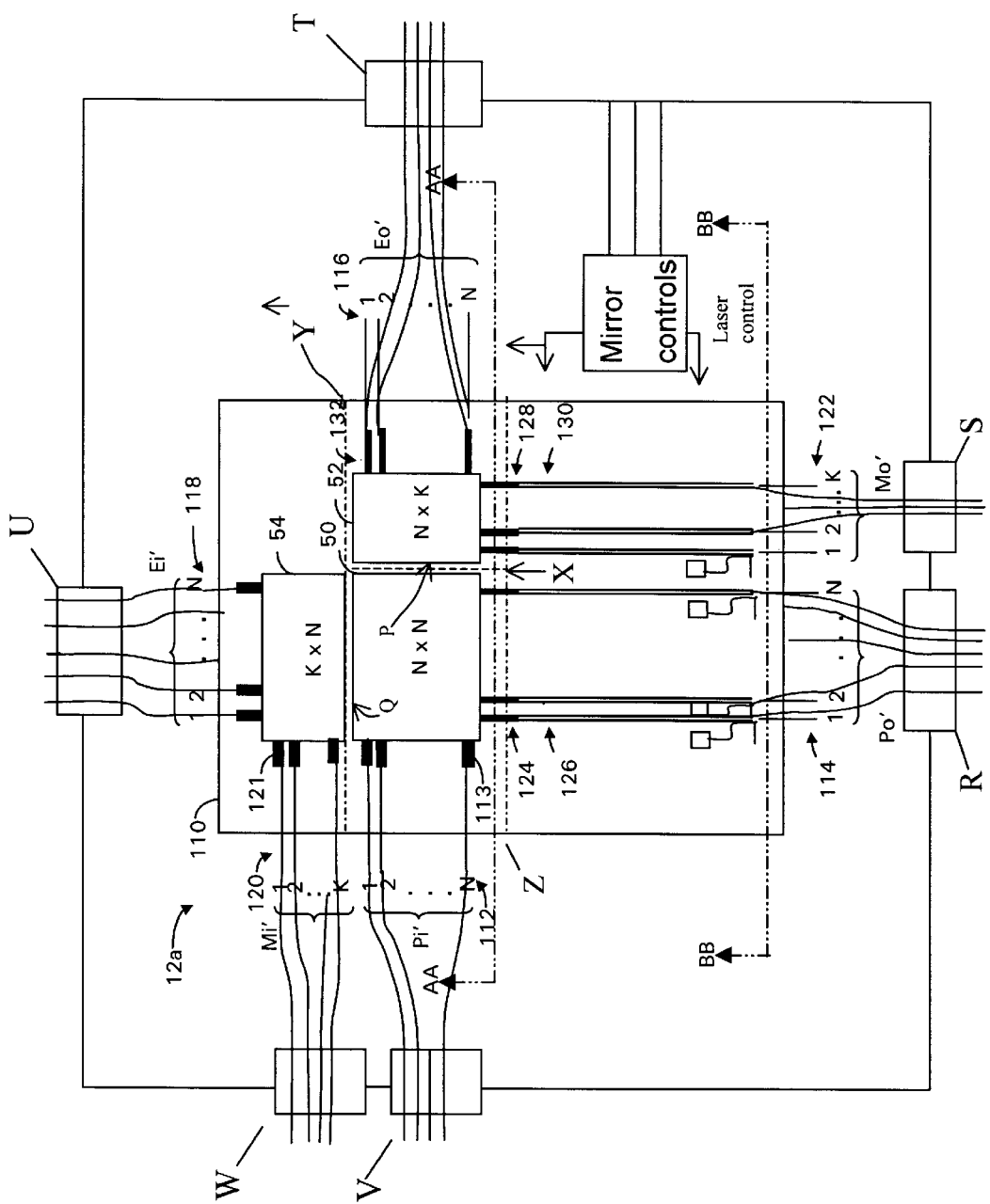

FIG. 4 shows a Hybrid Optical Integrated Circuit (HOIC) for implementing the entirety of an individual wavelength plane in an expandable wavelength plane switch with integral add/drop; access to wavelength conversion capabilities and including amplification, both for offsetting switch loss and/or switch node loss, but also for providing compensation of other per-wavelength amplitude errors, e.g. from external concatenated line system elements. The HOIC consists of several components, those being an N×N 2D-MEMS device 50 for port-to-port switching from port V to port R, an N×K 2D-MEMS device 52 for extracting drop traffic and/or traffic to be wavelength converted from the input at part V into the drop port at port S. and a K×N 2D-MEMS device 54 for inserting added traffic and/or wavelength converted traffic at port W into any of the N outputs from the module at port R.

The HOIC also includes an expansion output port at Port T to allow further per-wavelength-plane expansion, and an expansion input port at Port U to allow further per-wavelength plane expansion.

FIG. 4 shows the optical wavelength-plane switch 12a of FIG. 2 in a plan view. The wavelength-plane switch 12a is implemented as a monolithic optical switching device on a silicon substrate 110, however a multi-chip hybrid structure is also possible. The N×N matrix 50 of divertors, the N×K matrix 52 of divertors, and the K×N matrix 54 of divertors are fabricated on the substrate 110, or alternatively, are fabricated separately and then affixed to the substrate 110. The K×N matrix 54 is positioned to be adjacent the N×N matrix 50 with the outputs (O) of K×N matrix 54 aligned with the through inputs (Ti) of the N×N matrix 50 in a manner that provides optical coupling between the outputs (O) and the through inputs (Ti). Since the rod lenses at the Ei' input of 54 (port 118) project a nominally parallel beam across the top of the MEMS mirror array, as long as that beam is parallel, it can be projected across the top of 1, 2 or even 3 properly aligned MEMS switch arrays with a level of increased loss due to beam divergence and diffraction, dependent upon the level of error in the forming of that parallel beam. Hence, the optical coupling between the (O) ports of 54 and the (Ti) ports of 50 is a matter of aligning the beams exiting 54 to pass over 50 at the right point. Likewise for the other path direction. The N×K matrix 52 is positioned to be adjacent the N×N matrix 50 such that the inputs (I) of the N×K matrix 52 are aligned and optically coupled to the through outputs (To) of the N×N matrix 50.

Optical signals are directed to/from the matrices 50, 52, 54 via optical fibers positioned on the substrate 110 and aligned with corresponding inputs or outputs of the matrices 50, 52, 54 by alignment features provided on the substrate 110. These alignment features will be described in more detail later. N optical fibers 112, 114, 116, 118 for each of the N port inputs Pi', N port outputs Po', N expansion inputs Ei', and N expansion outputs Eo', respectively, are used to direct optical signals on/off the wavelength-plane switch 12a as shown in FIG. 2a. Likewise, K optical fibers 120, 122 for each of the K matrix inputs Mi' and K matrix outputs Mo', respectively, perform the same function.

The wavelength-plane switch 12a further includes a plurality N of rod lenses 124, each of which is aligned with an output (O) of the N×N matrix 50, a plurality K of rod lenses 128, each of which is aligned with an output (O) of the N×K matrix 52, and a plurality N of rod lenses 132, each of which is aligned with a through output (To) of the N×K matrix 52. Similarly, the matrix 12a includes a plurality N of rod lenses 113, each of which is aligned with an input (I) of the N×N matrix 50, and a plurality K of rod lenses 121, each of which is aligned with an input (I) of the K×N matrix 54. Each lens of the plurality of N of rod lenses 124 is aligned with a respective waveguide of a plurality N of Erbium doped silica ($SiO_2$) or phosphate-glass waveguides 126, each of which is aligned with a respective fiber of the plurality of N fibers 114. Similarly, each lens of the plurality K of rod lenses 128 is aligned with a respective waveguide of a plurality K of Erbium doped silica ($SiO_2$) or phosphate-glass waveguides 130; each of which is aligned with a respective fiber of the plurality of K fibers 122. The rod lenses 124, 128 focus optical signals received from the matrices 50, 52 into the waveguides 126, 130. The waveguides 126, 130 are part of the optical amplifiers 55, 57 previously mentioned. Each lens of the rod lenses 132 is aligned with a respective fiber of the plurality N of optical fibers 116 for the purpose of focusing optical signals from the matrix 52 into the optical fibers 116.

Erbium doped waveguide amplifiers, fabricated by constructing Erbium doped $SiO_2$ waveguides of about 10 micron by 10 microns on a silicon substrate are also included. These are energized from an array of lasers coupled into the waveguides by a coarse WDM coupler, which is designed to couple between itself and the amplifier waveguide at wavelengths around 980 nm; but not at the wavelengths of interest to the traffic (typically 1500–1550 nm), since such coupling would extract traffic signal optical power from the amplifier, reducing its gain. The amplifier tracks are therefore 10 micron×10 micron $SiO_2$ on Silicon tracks placed with their centers on a pitch that matches that of the MEME mirrors (typically 80 microns) although other spacings are possible by introducing curved sections into the tracks. Metal pillars 10 microns thick can be built between the amplifier tracks to provide connectivity to, and to support, the pump lasers which could then be in the form of a high power VCSEL array. In this case the laser facets would be located such that they emitted light down towards the end of the coarse WDM coupler and the end of that coupler would incorporate a 45 degree mirror to couple the light into the coupler. Alternatively conventional lasers could be located in etched pits and butt-coupled to the coupler.

The amplifiers, lasers, couplers and switches could be fabricated on a single substrate 110 or they could be fabricated as individual piece parts that are then precision-aligned onto the substrate 110. This alignment can be facilitated by making each of the piece parts on a Silicon substrate since several known methods exist to fabricate extremely precise alignment structures between silicon substrates. These methods include the use of MEMS latches (as detailed by Lin), multiple V-grooves with locking rods. Several partitions are possible, along lines Z, Y and even X. Line Z would separate the amplifiers from the MEMS structures and, assuming that the matrices 52, 50 are accurately located with respect to their portion of the substrate 110, then the rod lenses 124 . . . 128 (in conjunction with return equivalent features) could provide the necessary alignment. If not sufficient, additional V-groove features can be used to provide further alignment. Line Y would allow the K×N matrix 54 to be fabricated and if necessary pigtailed separately to the unit comprising matrices 50, 52. This pigtailing is advantageous since it would allow for a product yielding stage at a level of two attached pigtails per module instead of four. However, since the pigtails would not yet be assembled into the package walls, care would be required in handling these units. To illustrate this advantage let us assume that we have a pigtailing yield of 50% per pigtail. Then a four pigtail unit would have a yield of 12.5% whereas a two pigtail unit would have a yield of 25%. As long as the two units can be butt coupled with a yield well above 50%, this approach is favourable. This can be taken one stage further by exploiting line X.

The matrices 50, 52 and 54 in the form of MEMS devices would be mounted onto substrate 110 or its component parts. In a conventional four port MEMS making electrical connections to the MEMS is very difficult since all four faces are occluded by optical connections. In the case of this wavelength-plane switch 12a however each MEMS device has two faces that are not directly coupled into entry or exit optical paths, although there are still free space light beams fairly close to the MEMS surface. Hence, by not fully butt-coupling the MEMS, but rather mounting them precisely, close to each other which can be done via alignment features on the MEMS die or by alignment features on the substrate 110, then relatively narrow trenches can be formed at P. This would permit an array of wirebonds to link the MEMS chip to the substrate 110 on two sides of the MEMS. This linking is obviously further facilitated by exploiting the partitioning of 110 along X, Y, since this would provide better access for the wire bonding process, or other equivalent process to link the MEMS to the substrate 110. The tracks to the wire bond pads could be run as features on the substrate underneath the MEMS matrices 50, 52, 54 as long as appropriate features are designed into substrate 110 to ensure precise vertical alignment of the MEMS at a pre-determined height above the substrate. This is not a normal way of mounting a silicon device, due to its relatively poor power dissipation capabilities, but in this case it is acceptable since there is very little power to dissipate.

Having access to two sides of the MEMS device facilitates the use of a scanned row and column approach for energizing the mirrors, resulting in a need for 2N connections (or N+K connections) instead of $N^2$ (or N×K) connections. However, to do this a simple electronic latch would have to be integrated into the MEMS substrate at each row/column intersection. This can be done with a pair of complementary dual gate FETS and a small integrated charge storage device, for example, a capacitor, though other known prior art scan/latch schemes can also be used. The MEMS may be energized from a matrix mirror driver, if the aforementioned scan latch functions are implemented in the MEMS or alternatively the matrix mirror drive could be replaced with a dedicated mirror driver array, which would probably be implemented in one or more integrated circuits per MEMS because of the high pin-out. This requires 256 pins for the 16×16 version of MEMS, rising to 1024 pins for the 32×32 version. In contrast, the scanning technique would permit a 16×16 using 32 (or 33) drive lines, and 32×32 using 64 (or 65) drive lines for an improvement of 8:1 and 16:1, respectively. The mirror driving ASICs can themselves be driven from a module control ASIC that also controls the optical amplifier gains in dependence upon external commands. This is done by changing the value of the d.c. current through the pump laser which varies the pump power, and in turn varies the amplifier gain.

Several alternative implementations exist, for instance locating the control ASIC and pump lasers external to the package. In the event of a matrixed mirror driver the entire MEMS array could be controlled by 2 (N+K) pins which for a practical N=32, K=16 would give a relatively achievable pinout of 96 pins.

The HOIC further includes ribbon cable terminations with physical pitch expanders to couple to the MEMS pitch, amplifier pitch and with hermetic package wall seals at R, S, T, V, V, W. The ribbon pitch is 250 microns whereas the MEMS, amplifiers pitch may be between 700–1000 microns, for example purposes 800 microns will be assumed. Hence, a 16 fiber ribbon, at 15×250 microns outer center to outer center pitch, or about 3.75 mm, would be expanded up to 15×800 micron=12 mm pitch. The fiber ribbon expanders may be joined via a sub-mount to the rod lenses prior to final assembly, especially if a rod-lens-array is used.

FIG. 5 shows an optical amplifier 55a of the plurality of optical amplifiers 55 in greater detail. The optical amplifier 55a is an Erbium-doped waveguide amplifier (EDWA) including a pump laser 200a, an erbium doped amplifying waveguide track 126a and a WDM coupler element 202a. The amplifying waveguide track 126a is coupled to couple a free space optical input, via a rod lens 124a and is coupled to a single mode fiber 114a.

In operation, the pump laser 200a provides the optical energy to operate the amplifier and is coupled into the amplifying waveguide using the WDM coupler element 202a. The amplifying waveguide and the coupling WDM can be implemented as an array of multiple instantiations of amplifiers on a single silicon substrate, with the waveguides 202a, 126a being implemented in a suitable optical material such as $SiO_2$ or phosphate-glass. Each optical amplifier of the plurality of optical amplifiers 55 and 57 is identical to the optical amplifier 55a, however, this is not necessary. For example, different gains in the plurality of optical amplifiers 55 and 57 may be desired, in which case the amount of Erbium doping, laser pump power, and coupling distance between the waveguide and pump laser signal could be varied.

As the operation of Erbium-doped waveguide amplifiers is well understood in the art it will not be explained in detail here. Briefly, an optical signal is received by the rod lens 124a coupled into the Erbium-doped waveguide 126a, in which the erbium ions have been excited to a high energy state by the pump optical source. The signal photons at the wavelength to be amplified stimulate or trigger the release of energy from these higher energy states causing the emission of further photons, at the signal photon wavelength, creating an effective amplification. In doing so the power of the optical signal is increased and it emerges from the waveguide 126a where it is received by the fiber 114a and egresses the wavelength-plane switch 12a.

In FIG. 5, 124a, 126a, and 114a are contiguous and by the use of a bonding agent or index-matching agent provide a continuous optical path there through. The core, cladding, fiber creating on 114a is not shown. In practice 202a would be a short part of the length of 126a. The rod lenses 124 are aligned with the center of an erect mirror from matrix 50. The MEMS devices are mounted well below the mounts for the rod lenses. This is shown in FIG. 6b.

FIG. 6a is a cross-sectional view of the wavelength-plane switch 12a taken along the line AA in FIG. 4. Alignment features previously referred to will now be described. The matrices 50 and 52 are shown in outline affixed to the substrate 110 in an alignment well 154 which provides a spacing 156 between the matrices 50, 52. The rod lenses are aligned with the erect MEMS mirrors. The alignment well 154 provides alignment of the matrices 50, 52 (and 54 not shown) when the matrices are not fabricated on the substrate 110 and need to be affixed to the substrate during manufacturing of the wavelength-plane switch 12a. The alignment well lowers the MEMS chips to the point where the mirror centers align with the rod lenses.

A groove 138a having a V-shaped cross-section is etched into the planar substrate 110 to position the rod lens 124a in alignment with the waveguide 126a and the output (O) of the N×N matrix 50. The groove 138a positions the rod lens 124 axially parallel to the plane of the substrate 110 and at a desired length relative to the surface substrate 110 into which the groove 138a has been etched. There is a similar groove 138 etched in the substrate 110 for each rod lens of the plurality of lenses 124. Likewise, a groove 140a of V-shaped cross-section is etched into the substrate 110 for aligning the lens 128a in height and direction with a respective one of the waveguides 130 and an output (O) of the N×K matrix 52. A plurality of such grooves is provided for the remaining lenses of the plurality of rod lenses 128. A plurality of such grooves, each orthogonal to the groove 140a in the plane of the substrate 110, is provided for aligning the plurality of rod lenses 132. One such groove 150n for aligning the rod lens 132n is shown in FIG. 6. A spacing 158 is provided between the rod lens 132n and the matrix 52. The size of the spacing 158 is determined by the space between the alignment well 154 and the groove 150n.

Each fiber of the pluralities of fibers 112, 114, 116, 118, 120, and 122 is provided with a corresponding alignment groove of V-shaped cross-section etched into the substrate 110. One such groove 152n is shown in FIG. 6 for one fiber 116n. The groove 152n is shown as being shallower in depth than any of the grooves 138a, 140a, and 150n, which are shown in FIG. 6 as having the same depth. However, the depth and width of any particular groove depends on the size of its corresponding rod lens or fiber and the height of the lens/fiber relative to the surface of the substrate 110 to adequately align the lens/fiber with an output of a matrix 50, 52 or waveguide 126, 130 for the purpose of optical signal transmission therethrough.

FIG. 6b shows further details of the cross-sectional view of the wavelength-plane switch 12a shown in FIG. 6a. Shown in greater detail are the rod lenses 124a, 124b, 124c, grooves 138a, 138b, 138c, and MEMS mirrors 160a, 160b, 160c. MEMS mirrors 160a and 160c are illustrated in an active state in which they deflect incident beams through 90 degrees in a plane parallel to the substrate 110. MEMS mirror 160b is shown in an inactive state in which a beam will pass over it without deflection. FIG. 6a also generally illustrates the alignment of MEMS mirrors 160 and rod lenses 124 as provided by V-grooves 138 which center the rod lenses 124 on the center of the MEMS mirrors 160. In FIG. 6a and 6b the MEM substrate is shown in a well 154 in substrate 110 and V-grooves 138 are etched into the substrate 110. An alternative embodiment, not illustrated, is to laminate both the MEMS matrix 50 and a substrate bearing V-grooves 138 to a common substrate. In this case, the upper surface of the common substrate would correspond to the bottom of well 154.

FIG. 7a is a cross-sectional view of a portion of the wavelength-plane switch 12a taken along the line BB in FIG. 4. A plurality of alignment grooves of V-shaped cross-section etched into the substrate 110 are provided for the plurality of fibers 114 and 122, as stated previously. FIG. 7 shows one of these grooves 170a for one of the fibers 1 14a, and their alignment with the waveguide 126a, the groove 138a, and the rod lens 124a. The alignment well 154 for the MEMS matrix 50 is also shown in relation to these grooves 138a and 160a.

FIG. 7b shows further details of the cross-sectional view of FIG. 7a. The rod lenses are typically 500–800 μm in diameter, whereas the amplifying waveguide is typically 6–10 μm on a side. Hence the FIGS. 6a, 6b, 7a and 7b to not attempt to show the relative sizes, that is the figures are not to scale. The fiber 114a is further shown to include a fiber optical channel 114a', enclosed in fiber cladding 114a", and surrounded by a plastic coating 114a'". The axial alignment of the rod lens 124a, the silicon waveguide 126a, and the fiber optical channel 114a' is shown. This is accomplished by the V-grooves 170a and 138a for positioning the fiber 114a and rod lens 124a, respectively, in relative axial alignment.

There are co-planarity requirements on several design features illustrated in FIGS. 4, 6 and 7. Chief amongst these is that the physical size of the V-grooves to align the fibers to the rod lenses (e.g. 124a in FIG. 7b) places the fiber core in a position where its center is one-half of the height of the amplifying waveguide height (height of 126a) above a reference plane 172 plane parallel to the substrate 110. This causes the rod lenses to accurately couple to fiber on to amplifying waveguides while all being at the same height above the MEMS for centering on all of the centers of the MEMS mirrors.

The V-grooves are precisely etched exploiting the crystal structure of the silicon. The size of the grooves is determined by the need to accurately align components in two axes; that of across the groove and that of perpendicular to the substrate. Alignment in longitudinal degree of freedom is provided by other means (e.g. end to the groove). The vertical alignment perpendicular to the substrate is very important for rod lens—fiber coupling (achieved by the use of two different sizes of V-groove) and rod lens—amplifying waveguide alignment. This is achieved by using a specific dimension of V-groove, that is dependent upon the rod lens diameter to place the center of the rod lens in alignment with the center of the amplifying waveguide.

Modifications, variations and adaptations to the embodiments of the invention described above are possible within the scope of the invention, which is defined by the claims.

What is claimed is:

1. An optical switching device comprising:
   a first optical switch matrix having first and second port groups associated therewith and a plurality of optical inputs and a plurality of optical outputs;
   a second optical switch matrix having third and fourth port groups associated therewith and a plurality of outputs coupled to the plurality of optical inputs of the first optical matrix switch;
   a third optical switch matrix having fifth and sixth port groups associated therewith and a plurality of optical inputs coupled to the plurality of optical outputs of the first optical switch matrix;
   whereby the first optical switch matrix provides primary switching between the first and second port groups, the second optical switch matrix provides additional input port groups using the third and fourth port groups, and the third optical switch matrix provides additional output port groups using the fifth and sixth port groups.

2. An optical switching device as claimed in claim 1 wherein the first optical matrix comprises a plurality of optical divertors, each divertor being operable to divert an optical signal appearing at a port of the first port group to any one of a plurality ports of the second port group.

3. An optical switching device as claimed in claim 2 wherein each divertor is operable to divert an optical signal appearing at one of the plurality of optical inputs to any of the plurality of optical outputs.

4. An optical switching device as claimed in claim 3 wherein the third port group provides expansion input ports.

5. An optical switching device as claimed in claim 4 wherein the expansion input ports are for connection to another optical switch matrix.

6. An optical switching device as claimed in claim 1 wherein the second optical matrix comprises a plurality of optical divertors, each divertor being operable to divert an optical signal appearing at a port of the fourth port group to any one of the plurality of outputs.

7. An optical switching device as claimed in claim 6 wherein the third port group provides expansion input ports.

8. An optical switching device as claimed in claim 7 wherein the expansion input ports are for connection to another optical switch matrix.

9. An optical switching device as claimed in claim 1 wherein the third optical matrix comprises a plurality of optical divertors, each divertor being operable to divert an optical signal appearing at one of the plurality of inputs to any port of the sixth port.

10. An optical switching device as claimed in claim 9 wherein the fifth port group provides expansion output ports.

11. An optical switching device as claimed in claim 10 wherein the expansion output ports are for connection to another optical switch matrix.

12. An optical switching device as claimed in claim 9 wherein the sixth port group provides auxiliary output ports.

13. An optical switching device as claimed in claim 12 wherein the auxiliary output ports are for connection to a non-optical switch matrix.

14. An optical switching device as claimed in claim 1 wherein the optical switching device implemented as monolithic structures on a silicon wafer substrate.

15. An optical switching device as claimed in claim 14 wherein the optical amplifiers are an array of erbium doped Silica (Silicon Dioxide) waveguides fabricated on a silicon or similar substrate, in combination with a corresponding array of pump lasers, thereby enabling the gain of individual amplifiers to be set separately.

16. An optical switching device as claimed in claim 1 wherein the optical switching device is implemented as a multi-chip hybrid structure.

17. An optical switching device as claimed in claim 16 wherein the optical amplifiers are an array of erbium doped Phosphate-glass waveguides fabricated on a silicon or similar substrate, in combination with a corresponding array of pump lasers, thereby enabling the gain of individual amplifiers to be set separately.

18. An optical switching device comprising:
    a plurality of optical input ports;
    a plurality of optical output ports;
    a first matrix of optical divertors, each divertor being operable to divert an optical signal from one of the optical input ports to any one of a plurality of the optical output ports;
    a plurality of optical expansion input ports, each one of the optical expansion input ports coupled to a respective optical output port;
    a plurality of optical expansion output ports, each one of the optical expansion output ports coupled to a respective optical input port;
    a plurality of optical inter-matrix input ports;
    a second matrix of optical divertors, each divertor being operable to direct an optical signal from one of the optical inter-matrix input ports to any one of a plurality of the optical output ports;
    a plurality of optical inter-matrix output ports; and
    a third matrix of optical divertors, each divertor being operable to divert an optical signal from one of the optical input ports to any one of a plurality of the optical inter-matrix output ports.

19. An optical switching device as claimed in claim 18 further comprising a plurality of optical amplifiers, each one of the optical amplifiers coupled in series with a respective optical output port.

20. An optical switching device as claimed in claim 19 wherein the optical amplifiers are an array of erbium doped Silica (Silicon Dioxide) waveguides fabricated on a silicon or similar substrate, in combination with a corresponding array of pump lasers, thereby enabling the gain of individual amplifiers to be set separately.

21. An optical switching device as claimed in claim 18 further comprising a plurality of optical amplifiers, each one of the optical amplifiers coupled in series with a respective optical inter-matrix output port.

22. An optical switching device as claimed in claim 21 wherein the optical amplifiers are an array of erbium doped Silica (Silicon Dioxide) waveguides fabricated on a silicon or similar substrate, in combination with a corresponding array of pump lasers, thereby enabling the gain of individual amplifiers to be set separately.

23. An optical switching device as claimed in claim 18 wherein the optical switching device is implemented as monolithic structures on a silicon wafer substrate.

24. An optical switching device as claimed in claim 18 wherein the optical switching device is implemented as a multi-chip hybrid structure.

* * * * *